US 8,533,514 B2

(12) United States Patent
Rogers et al.

(10) Patent No.: US 8,533,514 B2
(45) Date of Patent: Sep. 10, 2013

(54) POWER-CAPPING BASED ON UPS CAPACITY

(75) Inventors: Harry R. Rogers, Bellevue, WA (US); Kushagra Vaid, Sammamish, WA (US); Mark E. Shaw, Sammamish, WA (US); Badriddine Khessib, Redmond, WA (US); Bryan Kelly, Redmond, WA (US); Matthew Faist, El Dorado Hills, CA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/168,983

(22) Filed: Jun. 26, 2011

(65) Prior Publication Data

US 2012/0331317 A1   Dec. 27, 2012

(51) Int. Cl.
*G06F 1/26* (2006.01)
(52) U.S. Cl.
USPC ............................. 713/340; 713/320; 714/14
(58) Field of Classification Search
USPC .................................. 713/320, 340; 714/14
See application file for complete search history.

(56) References Cited

U.S. PATENT DOCUMENTS

| 6,567,769 | B2 | 5/2003 | Chang |
| 6,633,823 | B2 | 10/2003 | Bartone et al. |
| 6,901,522 | B2 | 5/2005 | Buch |
| 7,117,377 | B2 | 10/2006 | Hagiwara et al. |
| 7,418,608 | B2 | 8/2008 | Kumar et al. |
| 7,421,599 | B2 | 9/2008 | Bahali et al. |
| 7,653,825 | B1 | 1/2010 | White et al. |
| 7,783,909 | B2 | 8/2010 | Hatasaki et al. |
| 8,392,729 | B2 * | 3/2013 | Egan et al. .................... 713/300 |
| 2003/0023885 | A1 | 1/2003 | Potter et al. |
| 2003/0084359 | A1 | 5/2003 | Bresniker et al. |
| 2008/0028246 | A1 | 1/2008 | Witham |
| 2009/0070611 | A1 | 3/2009 | Bower, III et al. |
| 2009/0228726 | A1 | 9/2009 | Malik et al. |
| 2009/0234512 | A1 | 9/2009 | Ewing et al. |
| 2009/0235097 | A1 | 9/2009 | Hamilton et al. |

(Continued)

FOREIGN PATENT DOCUMENTS

JP   4277638 B2   6/2009

OTHER PUBLICATIONS

Jiang, et al., "Enabling autonomic power-aware management of instrumented data centers", Retrieved at <<http:// ieeexplore.ieee. org/stamp/stamp.jsp?tp=&arnumber=5160976 >>, IEEE International Symposium on Parallel & Distributed Processing, May 23-29, 2009, 8 pages.

(Continued)

*Primary Examiner* — Albert Wang

(57) ABSTRACT

The power draw of equipment in a data center may be capped in order to keep the power draw under the capacity of the Uninterruptable Power Supply (UPS) that serves the data center. The current capacity of the UPS may be estimated, and the equipment may be controlled so as to keep the equipment's power draw under that current capacity. Factors that may affect the estimate of the UPS's current capacity include the history of temperature and humidity to which the UPS has been subject, and charge/discharge history of the UPS. Factors that may affect the decision of which equipment to throttle to a lower power level include: the current power load at the data center, the type of software that each server is running, and the demand for that software.

20 Claims, 4 Drawing Sheets

(56) References Cited

U.S. PATENT DOCUMENTS

| | | | |
|---|---|---|---|
| 2009/0282274 | A1 | 11/2009 | Langgood et al. |
| 2009/0287949 | A1 | 11/2009 | Bradicich et al. |
| 2009/0319650 | A1 | 12/2009 | Collins et al. |
| 2010/0026092 | A1 | 2/2010 | Iida et al. |
| 2010/0211669 | A1 | 8/2010 | Dalgas et al. |
| 2010/0211810 | A1 | 8/2010 | Zacho |
| 2010/0223085 | A1 | 9/2010 | Gauthier et al. |
| 2011/0119514 | A1* | 5/2011 | Kim et al. ............ 713/340 |
| 2011/0156480 | A1 | 6/2011 | Park |
| 2013/0007515 | A1 | 1/2013 | Shaw et al. |

OTHER PUBLICATIONS

Raghavendra, et al., "No 'power' struggles: coordinated multi-level power management for the data center", Retrieved at <<http://www.hpl.hp.com/techreports/2007/HPL-2007-194.pdf>>, Proceedings of the 13th international conference on Architectural support for programming languages and operating systems, internal accession date: Dec. 20, 2007, publication date: Mar. 1-5, 2008, 13 pages.

"International Search Report and Written Opinion of the International Searching Authority", Mailed Date: Feb. 28, 2013, Application No. PCT/US2012/042423, Filed Date: Jun. 14, 2012, 9 pages.

Wang, et al., "MIMO Power Control for High-Density Servers in an Enclosure", Retrieved at <<http://ieeexplore.ieee.org/stamp/stamp.jsp?tp=&arnumber=5406511>>, IEEE Transactions on Parallel and Distributed Systems, vol. 21 No. 10, Oct. 2010, pp. 1412-1426.

"Power In, DollarsOut: How to Stem the Flow in the Data Center", Retrieved at <<http://download.microsoft.com/download/3/0/2/3027D574-C433-412A-A8B6-5E0A75D5B237/Svr_Pwr_ITAdminV2.docx>>, Jul. 2, 2010, pp. 1-40.

"International Search Report and the Written Opinion of the International Searching Authority", Mailed Date: Nov. 29, 2012, Application No. PCT/US2012/036859, Filed Date: May 8, 2012, 9 pages.

"Statement Filed Pursuant to the Duty of Disclosure", filed in U.S. Appl. No. 13/168,983, Application filed Jun. 26, 2011, Statement filed on Jun. 26, 2011, 3 pages.

"Statement Filed Pursuant to the Duty of Disclosure", filed in U.S. Appl. No. 13/173,852, Application filed Jun. 30, 2011, Statement filed on Jul. 3, 2011, 3 pages.

* cited by examiner

POWER-CAPPING BASED ON UPS CAPACITY

BACKGROUND

A data center is a facility that houses servers and other computing equipment for large-scale applications. The expectation of uptime for equipment in a data center is very high. Moreover, the equipment, and the software that runs on the equipment, generally is not designed to shut down gracefully in the case of an abrupt power failure. Thus, data centers are generally equipped with backup power systems to ensure continuous delivery of power.

One type of component that is used to implement a backup power system is an Uninterruptable Power Supply (UPS). A UPS uses a flywheel or battery to store sufficient energy to compensate, temporarily, for disruptions in the power supply. For example, if utility power is lost, the data center may have an on-site backup generator, but may take a few seconds to start the generator. Thus, the UPS keeps the equipment running while power is switched from utility power to on-site generator power.

The UPS's capacity to deliver power acts as kind of a bottleneck for the data center. Even though the amount of time that the equipment is running on UPS power is short (normally measured in seconds), the UPS has to be able to deliver enough power to meet the demands of the equipment. Since power failures are normally unexpected, it is unknown exactly when the UPS will be called on to provide power, so the UPS has to be ready to deliver enough power when that power is called for. Although over-sizing of UPS capacity can help to ensure that the UPS can provide enough power, UPS equipment can be expensive, so significant over-sizing might not be feasible.

SUMMARY

The power load at a data center may be capped to ensure that the UPS(s) at the data center will be sufficient to meet the power demands of the loads, whenever the UPS is called on to meet those demands. UPS capacity tends to change over time (e.g., old UPS batteries may degrade), and the power load at the data center may also change. Thus, the amount of power drawn by the servers or other equipment in the data center may be capped, based on the current estimated capacity of the UPS and the current load from other equipment (such as cooling fans).

When a UPS is first installed, the UPS may be configured with new batteries. Over time, the data center is subject to heat, cold, and moisture. These environmental factors tend to degrade the batteries. Moreover, the batteries may be subject to charge and discharge cycles, which also tend to degrade the batteries. Additionally, the capacity of the UPS to deliver power may be affected by the way in which the cells in the battery are connect (e.g., in series versus in parallel). Thus, by considering the climate history at the data center and the usage history of the batteries, it is possible to estimate the current capacity of a UPS. As an alternative to batteries, some UPSs store energy using flywheels. While flywheels may be subject to different degradation factors, the ability of flywheels to deliver energy may change over time in response to some of the factors listed above (e.g., moisture may rust the flywheel, thereby causing more stored energy to be lost to friction).

In addition to considering the capacity of the UPS to deliver power, a data center may also consider the current draw of power by non-server equipment at the data center, such as cooling fans. Cooling fans generally draw more power when the weather is hot. Therefore, a UPS might have less power available to deliver to a server when the outdoor temperature is hot, since some of that power may be used to keep the climate control systems running. Thus, in addition to controlling the servers' usage of power based on the estimated UPS capacity, the servers' usage of power (or the usage of power by other equipment) may also be controlled to accommodate other power loads at the data center. Moreover, when deciding how much to limit the usage of power by a particular server, one may also take into account the particular application that is running on the server, since different applications may be affected differently by throttling the servers on which the applications are running.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
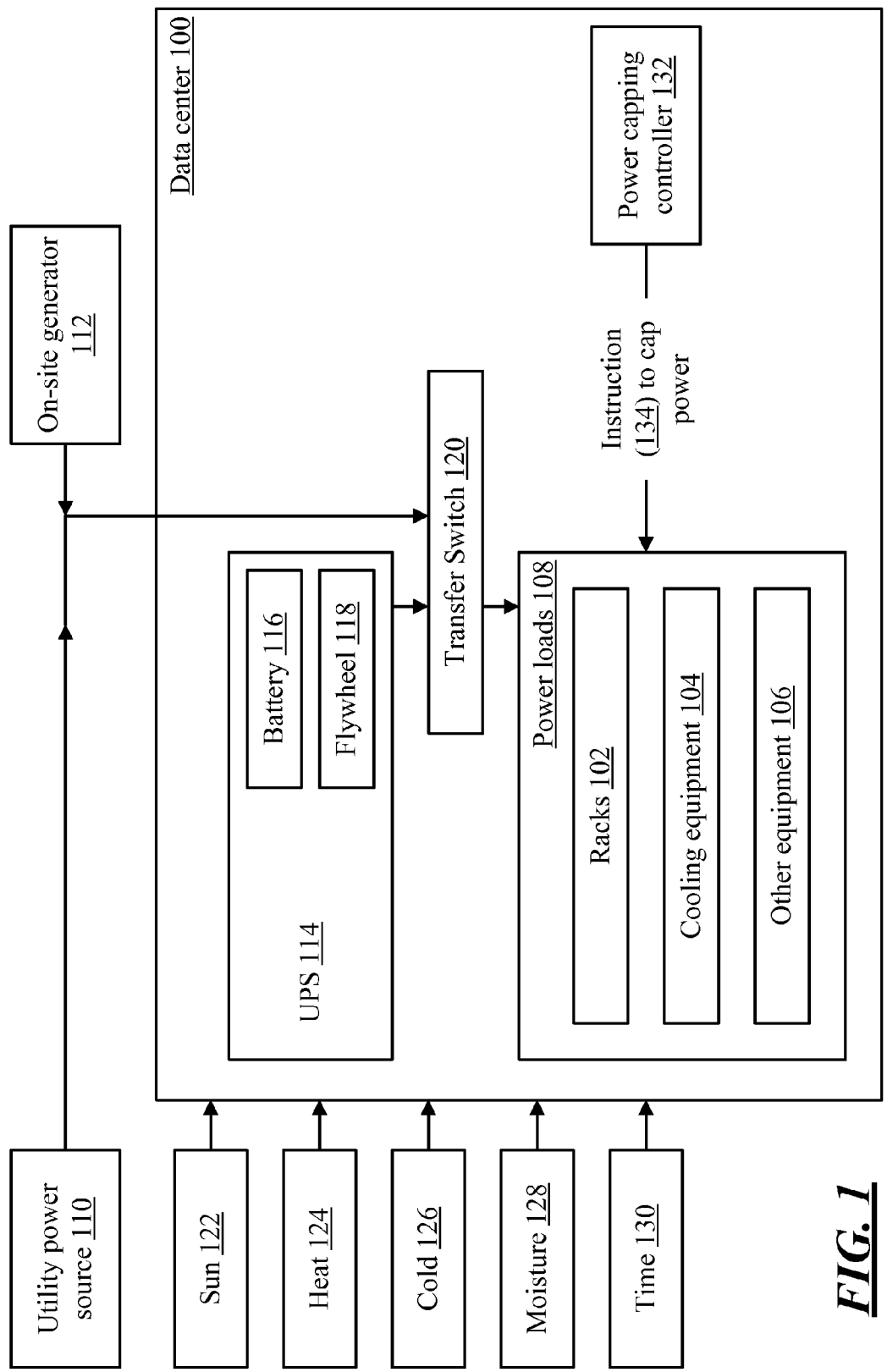
FIG. 1 is a block diagram of an example data center in which a UPS may be used.

A data center is a facility that houses servers and other computing equipment. A data center could take the form of a permanent structure that houses equipment, a temporary and/or portable container for such equipment, a collocation center, or any other form. The nature of the equipment and software that runs in a data center is such that the expectation of uptime is very high. Allowing a data center to lose power might take offline a service that people are depending on worldwide (such as an e-mail system or online retail service). Moreover, even if the power outage is short (e.g., a few seconds), the servers in the data center, and the software that runs on those computers, generally is not designed for an abrupt loss of power. Thus, a loss of power to a data center might cause problems that range from annoying (loss of a worldwide service for a few minutes) to catastrophic (physical damage to equipment, or unrecoverable loss of data due to an abrupt shutdown that the equipment and software were not prepared to deal with).

In order to prevent abrupt shutdowns, data centers are generally equipped with various levels of backup power systems. Typically, the data center receives power from an electric utility, but also has on-site backup generators. The backup generators are typically run by liquid-fueled combustion engines, such as Diesel engines. Since the fuel is expensive, these engines are not kept running all the time, but rather have to be started when a power outage occurs. Starting a combustion engine can take at least a few seconds, but utility power outages are quite abrupt. Therefore, in the event of a power outage, there is likely to be a few seconds between loss of utility power and delivery of on-site generator power. While a few seconds is a short time, computer equipment cannot run for even a few seconds without power. Thus, data centers are normally equipped with Uninterruptable Power Supplies (UPS), which can provide power for a short time to bridge the time gap between utility power and on-side generator power. In one example configuration, the utility power source and the output of the UPS are connected to a transfer switch. The transfer switch receives two power inputs and provides a power output to the servers and other equipment. If the transfer switch perceives that power has been lost at its first power input (which is connected to the utility), then it seamlessly switches the power draw to its second input (the UPS). When power has been restored at the first input, the transfer switch switches its power draw back from the second input to the first. The UPS may be able to provide fifteen or twenty seconds worth of power, which is sufficient time to start the generators and patch them into the line through which utility power is normally received, thereby allowing power to be restored to the transfer switch's first input. It is noted that the foregoing describes an example topology that may be used to wire a data center, power delivery to a data center could be provided in other topologies, or by using different components, and the subject matter herein is not limited to any particular topology.

While a UPS can provide some amount of power for some amount of time, different UPS configurations may have different capacities to do so. Moreover, the capacity of a UPS may change over time. A UPS is generally configured with one or more rechargeable batteries and/or one or more flywheels to store energy. In the case of rechargeable batteries, the ability of the battery to deliver power may change with the battery's age, the temperature and/or moisture conditions to which the battery has been subject, the number of charge and discharge cycles to which the battery has been subject, the way in which the cells in the battery are configured (serial or parallel), and various other factors. Changes in the power-delivery capabilities of flywheels may be influenced by different factors, but the flywheels' capacity can change over time—e.g., subjecting a flywheel to moisture for three years may cause the flywheel axle to rust slightly, thereby increasing the amount of stored energy that is lost to friction. Thus, at any given time, the ability of the UPS to carry the load at the data center when utility power fails may depend on the initial configuration of the UPS, and the history of the UPS.

Moreover, at any given time, the amount of power that the UPS can provide to servers may be limited by other conditions at the data center. For example, the cooling fans in the data center may also draw power through the UPS, and cooling fans use more power when the weather is hot. Thus, the outside temperature is an example of a condition that may limit how much power the UPS can provide—not in the sense of limiting the UPS's ability to provide power, but rather by limiting how much of that power can be provided to the servers.

Since the servers have to be able to run on UPS power for a few seconds while the data center switches to generator power, the servers cannot draw more power than the UPS(s) can provide. If they did, then the brief time that they were on UPS power might cause the servers to shut down, or act erratically due to low voltage (since the inability of the UPS to provide all the power the servers are drawing would, from the servers' perspective, simulate brownout conditions). One way to ensure that the servers will not draw more power than the UPS(s) can provide is to over-size the UPS capacity for the data center. For example, if a UPS has a lifespan of four years and can be expected to have its capacity to degrade 40% over that four-year period, then one could buy UPS capacity at 167% of expected load (since a 40% reduction in the 167% UPS capacity would bring the capacity down to 100% of the expected load). However, UPS capacity is expensive, so it might not be feasible to provide significantly over-sized UPS capacity.

The subject matter described herein provides a way to cap power load in order to allow servers in a data center stay within the current UPS capacity. A data center may be controlled by a data center management system, which is effectively a set of one or more computers that control operations at the data center. Software executing in the data center management system may calculate the current estimated capacity of UPSs at the data center. The capacity of a UPS may be based various factors, such as its history and its configuration. With regard to history, the current capacity of a UPS might be based on the age of its batteries, the history of temperature and humidity to which the batteries have been subject, this charge and discharge cycles that the batteries have been through, or various other historical factors. With regard to configuration, the current capacity of a UPS might be based on the initial capacity of its batteries, the chemistry of those batteries (e.g., NiCad, NiMH, or some other chemistry), the way in which the cells in the batteries are connected (e.g., series versus parallel), or any other appropriate factors. And, as noted above, even if the UPS has capacity to deliver power, the current conditions at the data center (e.g., high temperature, thereby causing more power to be drawn by the cooling fans) may affect how much of that power can be delivered to the servers.

Based on how much UPS power can be delivered to the servers, software in the data center management system may cap the power draw by one or more of the servers, or other equipment in the data center infrastructure such as pumps, compressors, fans, etc. For example, the software may instruct the server to slow down its CPU, or turn off a disk drive, or throttle its network connection, or take some other action that reduces the amount of power drawn by the server. The particular amount that a given server (or other type of component) is instructed to lower its power draw may be based on various factors. For example, a server exists to run one or more applications, and the amount of power called for to meet client demand may differ from one application to another, or based on the time of day. For example, one application might have a very high demand at all times of day, so throttling the server on which that application runs might be impractical, since doing so would significantly impact performance of the application. On the other hand, another application might have little demand during the day in North America, and almost no demand at other times. The server on which such an application may be throttled, to reduce its power draw, without having much effect on the performance of the application. Moreover, the actual amount that a server is requested to reduce its power draw may be based on how long the operator of the data center want to be able to run on UPS power. For example, a particular UPS might be able to provide 10 kilowatts of power for fifteen seconds, but might be able to provide 12 kilowatts of power for twenty seconds. Thus, the amount that a server is expected to throttle its power draw may be based on how long the operator of the data center believes it will take to switch from utility to generator power.

It is noted that battery-powered personal computer, such as laptops, may use information about the battery's history in order to estimate the current capacity of the battery, and may lower the computer's power consumption when the current capacity drops below some threshold while the computer is running on battery power. However, such systems differ from the subject matter described herein, since the subject matter herein may cause power consumption to be lowered in anticipation of the use of battery power, even when then relevant equipment is not actually running on battery power.

Turning now to the drawings, FIG. 1 shows an example data center in which a UPS may be used. Data center 100 is a facility in which various types of equipment may be housed. As noted above, data center 100 could be a permanent structure that houses equipment, a temporary and/or portable container for such equipment, a collocation center, or any other type of data center. For example, data center may contain racks 102 that hold server equipment running a variety of applications, cooling equipment 104 such as fans, and other types of equipment 106. From the perspective of the data center's power delivery infrastructure, these various types of equipment constitute power loads 108, in the sense that they draw power in order to operate.

In order to power this equipment, data center 100 may be served by a utility power source 110. Utility power source may be, for example, a connection to the local electric utility. Additionally, data center 100 may be served by an alternative power source, such as on-site generator 112 (or a plurality of such generators). On-site generator 112 can be patched into the power line that connects data center 100 to utility power source 110, so that it can function as a replacement for the power of utility power source 110 in the event that the utility fails. As noted above, on-site generator 112 may generate electricity using a combustion engine, which is powered by expensive liquid fuel. Such an engine has two relevant properties: (1) due to the expense of the fuel, it is generally not running until utility power source 110 fails, and (2) it takes at least a few seconds to start the motor and patch in the power that the generator provides.

In order to allow on-site generator 112 some amount of time to start up and to start delivering replacement power, data center 100 may have a UPS 114, which can provide power temporarily using a battery 116 or flywheel 118. In a typical arrangement, utility power source 110 and the output of UPS 114 are connected, as inputs, to a transfer switch 120. Power loads 108 are then connected to the output of transfer switch 120. Transfer switch 120 delivers power from utility power source 110, unless such power is not available, in which case transfer switch 120 delivers power from UPS 114. While FIG. 1 shows an example using transfer switch 120, some UPSs may function, effectively, as transfer switches, in which case the power loads 108 are connected directly to the output of the UPS, which can either pass power along from the utility source or from the UPS's battery or flywheel, depending on the availability of the utility power source. While FIG. 1 shows only a single UPS for simplicity of illustration, a data center may use any number of UPSs.

While data center 100 operates, data center 100—and, by extension, the equipment in data center 100—is subject to various environmental influences. These influences include sun 122, heat 124, cold 126, moisture 128, and the passage of time 130. Any of these may degrade the equipment in data center 100, and UPS 114 is no exception to this possibility of degradation. Moreover, as noted above, UPS 114 may degrade due to non-environmental factors, such as the number of times that the battery 116 in UPS 114 has been charged or discharged. Thus, it may be possible to calculate (or, at least, to estimate) how much capacity UPS 114 currently has. Estimating this current capacity may be performed by power capping controller 132. Power capping controller 132 may be a software component that executes in the computers that manage data center 100. Power capping controller 132 may make this estimate based on the initial configuration of UPS 114, and also based on the history to which UPS 114 has been subject since UPS 114 was initially installed. Based on its assessment of how much capacity UPS 114 currently has, power capping controller 132 may issue an instruction 134 to any of the equipment in data center 100 for that piece of equipment to throttle its use of power. ("Any of the equipment in data center 100" may include computers, but may also include other equipment such as the cooling equipment.) As explained above, such throttling may allow the current power draw of the equipment in data center 100 to stay within the limits of what UPS 114 can provide, in the event that UPS is called upon to replace, temporarily, the power that would otherwise be provided by utility power source 110.

It is noted that FIG. 1 shows an example topology that may be used to provide power to data center 100. However, other topologies and/or different types of components may be used, and the subject matter herein is not limited to data centers that are wired using any particular topology or any particular set of components.

Figure 2:
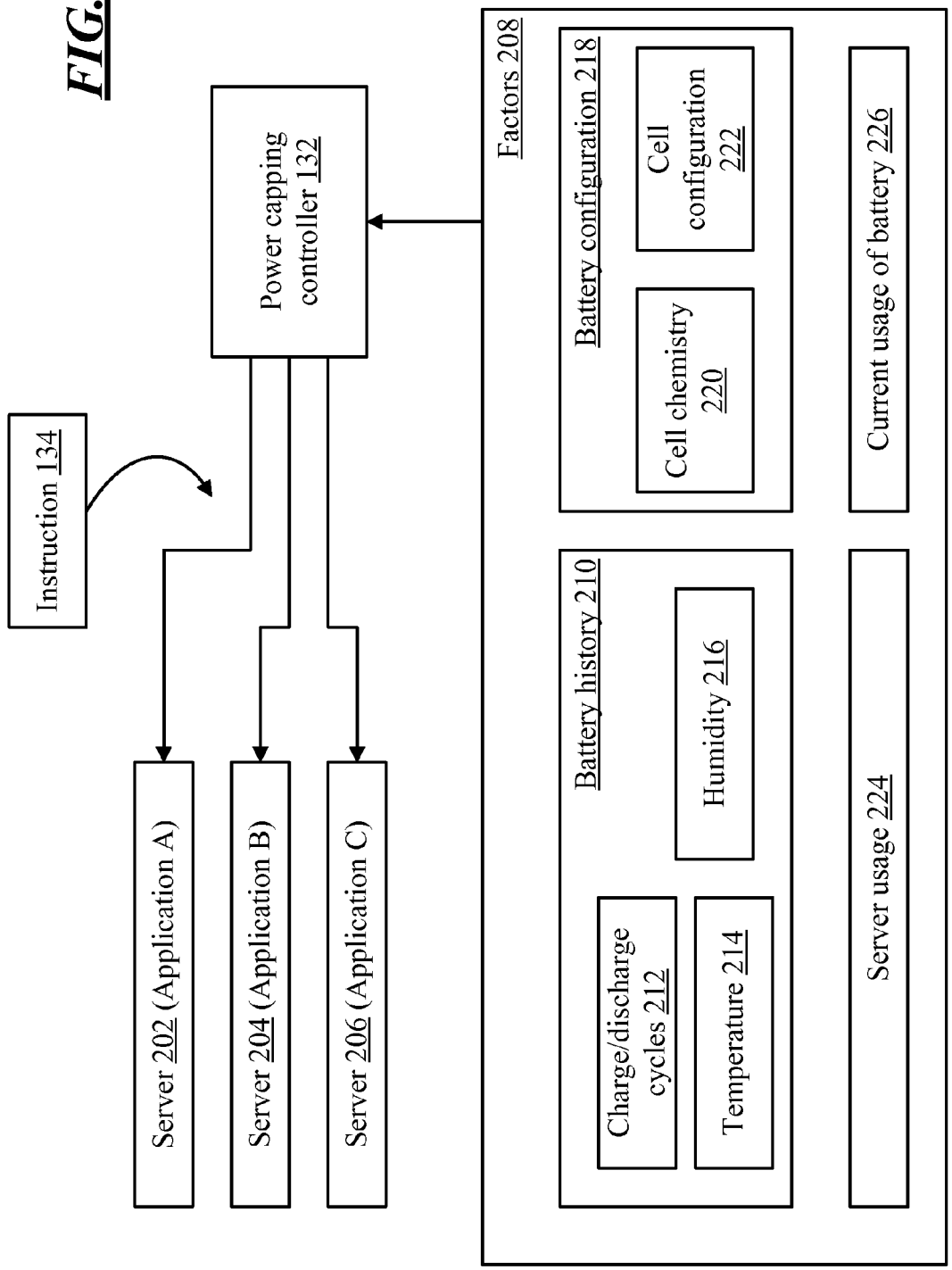
FIG. 2 is a block diagram of an example scenario in which a power capping controller may cap power usage to keep the power load within a UPS's capabilities.

FIG. 2 shows an example scenario in which a power capping controller may cap power usage to keep the power load within a UPS's capabilities. In the example scenario of FIG. 2 there are three servers 202, 204, and 206, although a data center could have any number of servers. In this example, each of servers 202-206 runs a different application, although a particular server could run multiple applications, and a particular application could run on multiple servers. However, in this example, server 202 runs application A, server 204 runs application B, and server 206 runs application C.

Power capping controller 132 may issue an instruction 134 to any of servers 202-206 (or to any other type of equipment in a data center), where instruction 134 instructs each of the servers (or other equipment) on how to throttle its components in order to cap its power draw. (In this case, throttling refers to running a component at less than its maximum capabilities—e.g., running a processor at a lower clock speed than the maximum possible, slowing the rotation of a disk drive, limiting the amount of traffic that a network interface can handle, etc.) The decision as to how much to instruct a server (or other equipment) to throttle its components may be based on various factors 208. Some examples of these factors are shown in FIG. 2, and are described below.

One example of factors 208 is battery history 210. In the case where a UPS uses a battery to store power, battery history may include charge/discharge cycles 212 that the battery has been through, the temperatures 214 and humidity 216 to which the battery has been subject, or any other portion of the battery's history. For example, a battery may be rated for only a certain finite number of charge and discharge cycles, and the battery may degrade with each cycle. Thus, the history of charge/discharge cycles 212 may affect the battery's current capacity. Likewise, the chemistry of the battery may be affected by temperature and/or humidity, so particularly hot (or cold) conditions, or particular humid (or dry) conditions may tend to degrade the ability of the battery to hold a charge.

Another example one of factors 208 is battery configuration 218. Battery configuration 218 may comprise, for example, the cell chemistry 220 and the cell configuration 222. With regard to cell chemistry 220, rechargeable batteries may be based on various chemistries, such as nickel cadmium (NiCad) or nickel metal hydride (NiMH), and these different chemistries may have different levels of tolerance to temperature swings, excessive humidity or dryness, or frequent charge/discharge cycles. With regard to cell configuration 222, the cells in a battery may be arranged in parallel, in series, or in some combination of these, and the way in which the cells are arranged may affect how well the battery tolerates conditions such as those mentioned above. Thus, power capping controller 132 may take these issues of battery configuration into account when estimating how much capacity a UPS currently has.

Another factor that power capping controller 132 may take into account when determining how to instruct servers to reduce their power load is the usage of the servers themselves (block 224). As noted above, in the example of FIG. 2, each server may be running a different application. Different applications may be more or less computationally intensive. For example, if application A is twice as computationally intensive as application B, then—all other things being equal—lowering the clock speed of server 202 will have more of an effect on application A's performance than lowering the clock speed of server 204 would have on application B's performance. Additionally, some applications may be more in demand than others. For example, application A might be more computationally intensive than application B, but application B might be very much in depend, and might be straining the capacity of server 204 to handle all of that demand. In this case, lowering the clock speed of server 204 might be ill-advised, and it might make more sense to lower the clock speed of server 202 instead (since application A, while computationally intensive, experiences very low demand). Or, different applications might experience higher or lower loads at different times of day (depending on what part of the world tends to use the application). Thus, it might be determined to lower one server's clock speed at one time of day, and another server's clock speed at a different time of day. In other words, power capping controller 132, when determining which servers to throttle, may take into account how those servers are being used in the real world, and may attempt to minimize the real-world detrimental effect that would result from the throttling.

Another factor that power capping controller 132 may take into account is the current usage of the battery (block 226). As noted above, the historical usage of the battery may determine how much energy the battery can hold. However, the current usage of the battery may determine how much of that energy is available to power the servers. For example, cooling fans may also be connected to a UPS, and the cooling fans may draw more power on a hot day. Thus, on a hot day, there might be less power available for the servers (because some of it is being consumed by the fans), so the servers might have to be throttled more than they would on a cool day. (And it is also noted that computers tend to run hotter when their components are running at maximum capacity; thus, throttling the servers may also have the effect of reducing the amount of cooling to be done, and thus the amount of power that the cooling fans draw.)

Figure 3:
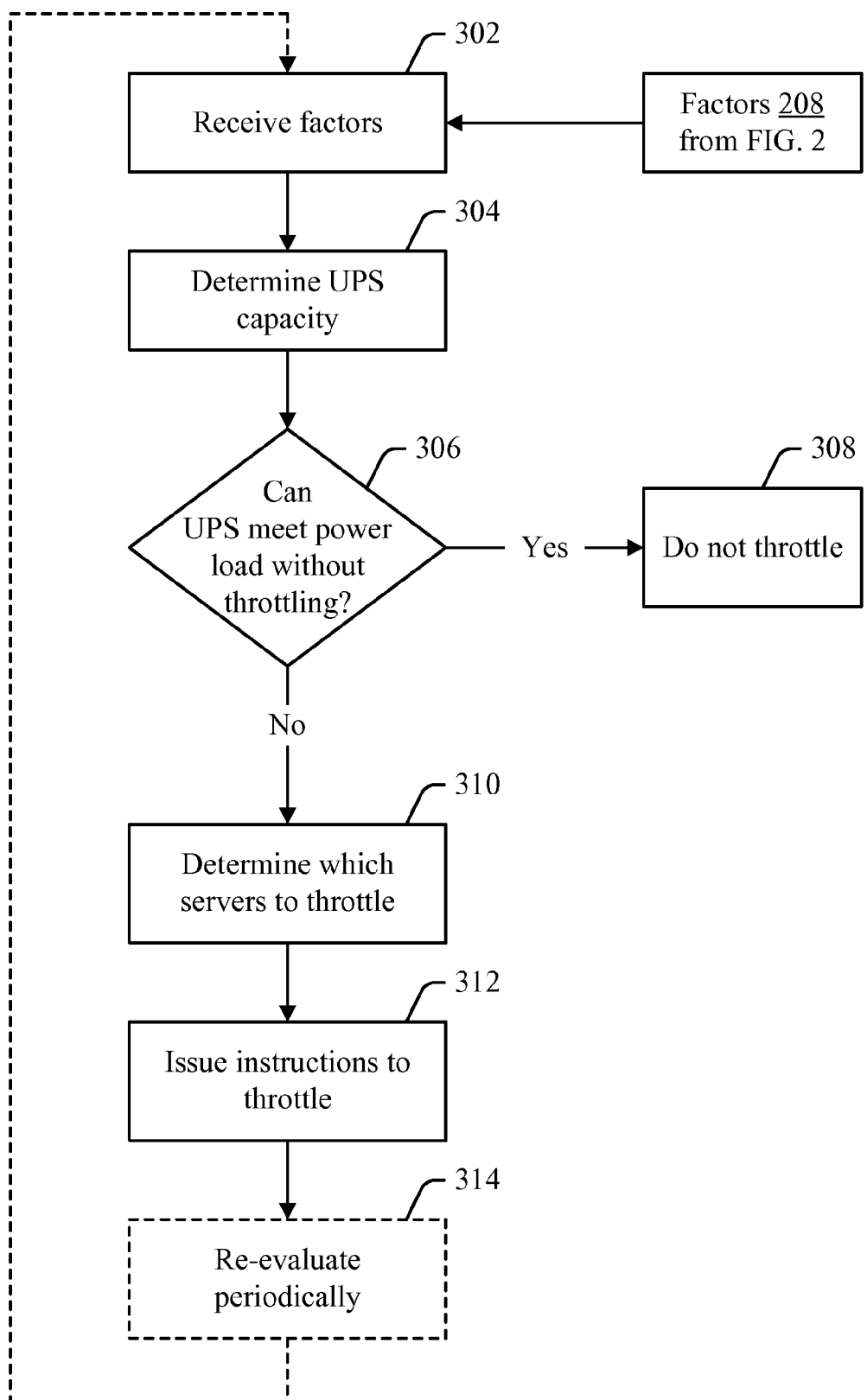
FIG. 3 is a flow diagram of an example power-capping process.

FIG. 3 shows an example power-capping process. The process of FIG. 3 may be carried out, for example, by power capping controller 132 shown in FIGS. 1 and 2, but may be carried out by any other type of system. Before turning to a description of FIG. 3, it is noted that the flow diagram in FIG. 3 shows an example in which stages of a process are carried out in a particular order, as indicated by the lines connecting the blocks, but the various stages shown in FIG. 3 can be performed in any order, or in any combination or sub-combination.

At 302, factors that enter into the determination of how much capacity a UPS has, and which servers (or other equipment) to throttle, are received. For example, the factors that may be received are factors 208, which are discussed above in connection with FIG. 2. At 304, the estimated capacity of the UPS is determined, based on these factors. If the estimated capacity of the UPS exceeds the maximum (unthrottled) power load that the equipment connected to that UPS would draw in the absence of any throttling (as determined at 306), then the equipment is not throttled (at 308). On the other hand, if the estimated capacity of the UPS is not sufficient to meet the maximum power load of the equipment connected to the UPS, then it is determined (at 310) which servers to throttle. The factors received at 302 may be used to determine which servers to throttle; various conditions that may be used in determining which servers to throttle are discussed above in connection with FIG. 2. Based on the determination made at 310, throttling instructions may be issued to the applicable servers (at 312).

Conditions may change frequently. As the UPS ages and is subject to additional conditions, its capacity may degrade. Moreover, conditions at the data center may change rapidly (e.g., environmental conditions such as the outside temperature, or internal conditions such as the type of software that the servers are running and/or the demand for that software). Thus, the conditions may be re-evaluated periodically (block 314), which involves returning to 302 to receive factors 208 again, to re-assess conditions such as the capacity of the UPS, and to determine again which throttling instructions are to be issued.

Figure 4:
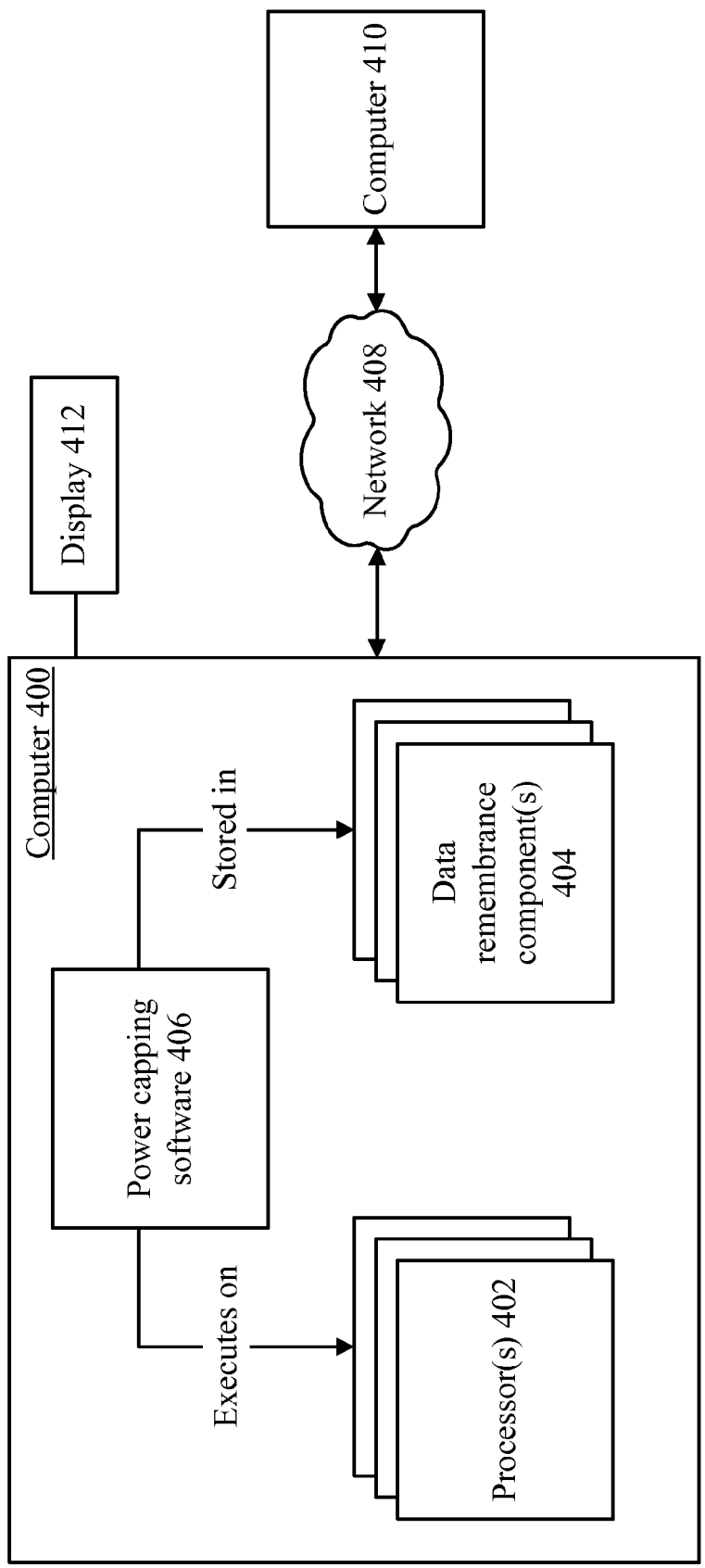
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, network-attached data storage services such as a Network Attached Storage (NAS) device or a Storage Area Network (SAN), etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is power capping software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media or computer-readable storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

The subject matter herein refers to an "Uninterruptable" Power Supply (UPS). It will be understood that a UPS is a type of component that delivers power in the event that the utility power source (or other power source) fails. However, UPSs themselves are subject to failure. They can run out of stored power, or they can break, or they can experience various other types of failures that might be understood, in some context, as "interruptions." It is therefore noted that the fact that a UPS is subject to failures, or that it might fail to deliver power in various situations, does not deprive the UPS of its status as an Uninterruptable Power Supply.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to cap power drawn by equipment in a data center, the executable instructions, when executed by a computer, causing the computer to perform acts comprising: determining a first amount of capacity in an Uninterruptable Power Supply (UPS) based on one or more factors; determining that a second amount of power used by a plurality of pieces of equipment in said data center exceeds said first amount of capacity; determining a set of said plurality of pieces of equipment that are to be throttled to reduce power usage of said pieces of equipment at or below said first amount; and issuing instructions to throttle pieces of equipment in said set, said instructions being issued when said pieces of equipment are operating on utility power and not on UPS power.

2. The one or more computer-readable storage devices of claim 1, said Uninterruptable Power Supply (UPS) using a battery to store energy, said one or more factors comprising a history of said battery.

3. The one or more computer-readable storage devices of claim 2, said history of said battery comprising temperatures to which said battery has been subject.

4. The one or more computer-readable storage devices of claim 2, said history of said battery comprising humidity levels to which said battery has been subject.

5. The one or more computer-readable storage devices of claim 2, said history of said battery comprising said battery's history of being charged and discharged.

6. The one or more computer-readable storage devices of claim 1, said Uninterruptable Power Supply (UPS) using a battery to store energy, said one or more factors comprising a cell chemistry of said battery.

7. The one or more computer-readable storage devices of claim 1, said Uninterruptable Power Supply (UPS) using a battery to store energy, said one or more factors comprising whether cells in said battery are arranged in serial or in parallel.

8. A method capping power drawn by equipment in a data center, the method comprising:
   determining a first amount of capacity in an Uninterruptable Power Supply (UPS) based on one or more factors;
   determining that a second amount of power used by a plurality of pieces of equipment in said data center exceeds said first amount of capacity;
   determining a set of said plurality of pieces of equipment that are to be throttled to reduce power usage of said pieces of equipment to a level at or below said first amount; and
   while said pieces of equipment are running on power from a utility, and not while said pieces of equipment are running on UPS power, throttling said pieces of equipment in said set to reduce power consumption of said pieces of equipment below said first amount.

9. The method of claim 8, wherein said pieces of equipment comprise servers, the method further comprising:
   determining which of said servers to throttle based on what software is running on each of said servers.

10. The method of claim 8, wherein said pieces of equipment comprise cooling fans and servers, said Uninterruptable Power Supply (UPS) being used to power said cooling fans and said servers in said data center, said method further comprising:
   determining, based on a temperature at said data center, that a third amount of capacity is available to power said servers due to said Uninterruptable Power Supply (UPS) being used to power said cooling fans, said third amount being less than said first amount; and
   throttling said servers in said set to reduce power consumption of said servers below said third amount.

11. The method of claim 8, said Uninterruptable Power Supply (UPS) using a battery to store energy, said one or more factors comprising a history of temperatures to which said battery has been subject.

12. The method of claim 8, said Uninterruptable Power Supply (UPS) using a battery to store energy, said one or more factors comprising a history of humidity to which said battery has been subject.

13. The method of claim 8, said Uninterruptable Power Supply (UPS) using a battery to store energy, said one or more factors comprising a history of charges and discharges of said battery.

14. The method of claim 8, said Uninterruptable Power Supply (UPS) using a battery to store energy, said one or more factors comprising a cell chemistry of said battery.

15. The method of claim 8, said Uninterruptable Power Supply (UPS) using a battery to store energy, said one or more factors comprising whether cells in said battery are connected in series or in parallel.

16. A data center comprising:

a plurality of servers;

an Uninterruptable Power Supply (UPS);

a connection to a utility power source; and a power capping controller that determines a first amount of capacity in said Uninterruptable Power Supply (UPS) based on one or more factors, that determines that a second amount of power used by a plurality of servers in said data center exceeds said first amount of capacity, that determines a set of said plurality of servers that are to be throttled to reduce power usage of said servers at or below said first amount, and that throttles servers in said set while said servers are running on power from said utility power source and not while said servers are running on power from said Uninterruptable Power Supply (UPS).

17. The data center of claim 16, said Uninterruptable Power Supply (UPS) using a battery to store energy, said one or more factors comprising a history of temperatures to which said battery has been subject.

18. The data center of claim 16, said Uninterruptable Power Supply (UPS) using a battery to store energy, said one or more factors comprising a history of humidity levels to which said battery has been subject.

19. The data center of claim 16, said Uninterruptable Power Supply (UPS) using a battery to store energy, said one or more factors comprising a history of charges and discharges of said battery.

20. The data center of claim 16, said Uninterruptable Power Supply (UPS) using a battery to store energy, said one or more factors comprising a cell chemistry of said battery.

* * * * *